US008639708B2

(12) United States Patent
Van Den Berg et al.

(10) Patent No.: US 8,639,708 B2
(45) Date of Patent: Jan. 28, 2014

(54) FACT-BASED INDEXING FOR NATURAL LANGUAGE SEARCH

(75) Inventors: Martin Henk Van Den Berg, Palo Alto, CA (US); Daniel Bobrow, Palo Alto, CA (US); Robert D. Cheslow, Los Angeles, CA (US); Barney Pell, San Francisco, CA (US); Giovanni Lorenzo Thione, San Francisco, CA (US); Chad Walters, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 12/201,596

(22) Filed: Aug. 29, 2008

(65) Prior Publication Data

US 2009/0063550 A1 Mar. 5, 2009

Related U.S. Application Data (60) Provisional application No. 60/969,478, filed on Aug. 31, 2007, provisional application No. 60/969,486, filed on Aug. 31, 2007.

(51) Int. Cl.
*G06F 7/00* (2006.01)
*G06F 17/30* (2006.01)

(52) U.S. Cl.
USPC ........... 707/755; 707/739; 707/741; 707/756; 704/4; 704/9

(58) Field of Classification Search
USPC ................... 707/739, 741, 755, 756; 704/4, 9
See application file for complete search history.

(56) References Cited

U.S. PATENT DOCUMENTS

| 4,876,643 | A | 10/1989 | McNeil et al. |
| 5,519,608 | A | 5/1996 | Kupiec |
| 5,530,939 | A | 6/1996 | Mansfield, Jr. et al. |

(Continued)

FOREIGN PATENT DOCUMENTS

| CN | 1606004 | 4/2005 |
| CN | 1658188 | 8/2005 |

(Continued)

OTHER PUBLICATIONS

Jun, M.S. and Park, S.Y., Keyfact-Based Information Retrieval System", TaeJon, Korea http://www.dl.slis.tsukuba.ac.jp/ISDL97/proceedings/miseon/miseon.html".

(Continued)

*Primary Examiner* — Shew-Fen Lin
(74) *Attorney, Agent, or Firm* — Shook Hardy & Bacon LLP (57) ABSTRACT

Computer-readable media and a computer system for implementing a natural language search using fact-based structures and for generating such fact-based structures are provided. A fact-based structure is generated using a semantic structure, which represents information, such as text, from a document, such as a web page. Typically, a natural language parser is used to create a semantic structure of the information, and the parser identifies terms, as well as the relationship between the terms. A fact-based structure of a semantic structure allows for a linear structure of these terms and their relationships to be created, while also maintaining identifiers of the terms to convey the dependency of one fact-based structure on another fact-based structure. Additionally, synonyms and hypernyms are identified while generating the fact-based structure to improve the accuracy of the overall search.

12 Claims, 6 Drawing Sheets

(56) References Cited

U.S. PATENT DOCUMENTS

| | | | |
|---|---|---|---|
| 5,696,962 | A | 12/1997 | Kupiec |
| 5,933,822 | A | 8/1999 | Braden-Harder et al. |
| 6,076,051 | A | 6/2000 | Messerly |
| 6,161,084 | A | 12/2000 | Messerly |
| 6,189,002 | B1 | 2/2001 | Roitblat |
| 6,243,670 | B1 * | 6/2001 | Bessho et al. ............... 704/9 |
| 6,246,977 | B1 | 6/2001 | Messerly et al. |
| 6,269,368 | B1 | 7/2001 | Diamond |
| 6,366,908 | B1 | 4/2002 | Chong et al. |
| 6,374,209 | B1 | 4/2002 | Yoshimi et al. |
| 6,654,740 | B2 * | 11/2003 | Tokuda et al. ............. 707/769 |
| 6,675,159 | B1 | 1/2004 | Klein et al. |
| 6,678,677 | B2 * | 1/2004 | Roux et al. ..................... 1/1 |
| 6,678,686 | B1 | 1/2004 | Patel et al. |
| 6,741,981 | B2 | 5/2004 | McGreevy |
| 6,766,316 | B2 | 7/2004 | Caudill et al. |
| 6,823,301 | B1 | 11/2004 | Ishikura |
| 6,842,730 | B1 | 1/2005 | Ejerhed |
| 6,871,199 | B1 | 3/2005 | Binning et al. |
| 6,901,399 | B1 | 5/2005 | Corston |
| 6,947,923 | B2 | 9/2005 | Cha et al. |
| 6,968,332 | B1 | 11/2005 | Milic-Frayling |
| 7,016,828 | B1 | 3/2006 | Coyne et al. |
| 7,027,974 | B1 | 4/2006 | Busch et al. |
| 7,031,910 | B2 | 4/2006 | Eisele |
| 7,035,789 | B2 | 4/2006 | Abrego et al. |
| 7,120,574 | B2 | 10/2006 | Troyanova et al. |
| 7,171,349 | B1 | 1/2007 | Wakefield et al. |
| 7,184,950 | B2 | 2/2007 | Weise |
| 7,194,406 | B2 | 3/2007 | Ejerhed |
| 7,225,121 | B2 | 5/2007 | Maxwell et al. |
| 7,269,594 | B2 | 9/2007 | Corston-Oliver |
| 7,319,951 | B2 * | 1/2008 | Rising et al. ............... 704/9 |
| 7,346,490 | B2 | 3/2008 | Fass |
| 7,398,201 | B2 | 7/2008 | Marchisio |
| 7,401,077 | B2 | 7/2008 | Bobrow et al. |
| 2002/0091684 | A1 | 7/2002 | Nomiyama et al. |
| 2002/0188586 | A1 | 12/2002 | Veale |
| 2003/0233224 | A1 | 12/2003 | Marchisio et al. |
| 2004/0103090 | A1 | 5/2004 | Dogl et al. |
| 2004/0243554 | A1 | 12/2004 | Broder et al. |
| 2004/0243556 | A1 | 12/2004 | Ferrucci et al. |
| 2004/0249795 | A1 | 12/2004 | Brockway |
| 2005/0043936 | A1 | 2/2005 | Corston-Oliver et al. |
| 2005/0065777 | A1 | 3/2005 | Dolan et al. |
| 2005/0071150 | A1 * | 3/2005 | Nasypny ..................... 704/9 |
| 2005/0108001 | A1 | 5/2005 | Aarskog |
| 2005/0108630 | A1 * | 5/2005 | Wasson et al. ............ 715/513 |
| 2005/0182619 | A1 | 8/2005 | Azara |
| 2005/0267871 | A1 | 12/2005 | Marchisio et al. |
| 2005/0283474 | A1 | 12/2005 | Francis et al. |
| 2006/0047632 | A1 | 3/2006 | Zhang |
| 2006/0156222 | A1 | 7/2006 | Chi |
| 2006/0161534 | A1 | 7/2006 | Carson, Jr. et al. |
| 2006/0184517 | A1 | 8/2006 | Anderson |
| 2006/0224582 | A1 | 10/2006 | Hogue |
| 2006/0271353 | A1 | 11/2006 | Berkan et al. |
| 2007/0073533 | A1 | 3/2007 | Thione |
| 2007/0073745 | A1 | 3/2007 | Scott |
| 2007/0143098 | A1 | 6/2007 | Van Der Berg |
| 2007/0156393 | A1 | 7/2007 | Todhunter et al. |
| 2008/0033982 | A1 | 2/2008 | Parikh |
| 2008/0086498 | A1 | 4/2008 | Sureka |
| 2008/0120279 | A1 | 5/2008 | Xue |
| 2008/0172628 | A1 | 7/2008 | Mehrotra |
| 2009/0019038 | A1 | 1/2009 | Millett |
| 2009/0271179 | A1 | 10/2009 | Marchisio et al. |
| 2010/0106706 | A1 | 4/2010 | Rorex |

FOREIGN PATENT DOCUMENTS

| | | |
|---|---|---|
| EP | 0597630 | 5/1994 |
| KR | 100546743 | 4/2005 |
| WO | 02067145 | 8/2002 |

OTHER PUBLICATIONS

Tablan, V., Damljanovic, D., and Bontcheva, K., "A Natural Language Query Interface to Structured Information", http://www.eswc2008.org/final-pdfs-for-web-site/onl-2.pdf.

Provisional Application with USPTO, U.S. Appl. No. 60/969,406, filed Aug. 31, 2007; Applying team occurrence constraints in natural language search.

Provisional Application with USPTO, U.S. Appl. No. 60/969,417, filed Aug. 31, 2007; Checkpointing of composable lazily-evaluated integrators in search.

Provisional Application with USPTO, U.S. Appl. No. 60/969,426, filed Aug. 31, 2007; Indexing of alias clusters for search.

Provisional Application with USPTO, U.S. Appl. No. 60/969,483, filed Aug. 31, 2007; Integration of Coreference Resolution in an Ambiguity-Sensitive Natural Language Processing Pipeline for a Search Platform.

Provisional Application with USPTO, U.S. Appl. No. 60/969,442, filed Aug. 31, 2007; Valence calculus for indexing with special reference to reported speech and thought.

Provisional Application with USPTO, U.S. Appl. No. 60/969,447, filed Aug. 31, 2007; Bucketized threshold for runtime pruning of senses/ranking.

Provisional Application with USPTO, U.S. Appl. No. 60/969,451, filed Aug. 31, 2007; Hierarchal probability-based weighting for hypernyms in word sense disambiguation.

Provisional Application with USPTO, U.S. Appl. No. 60/969,472, filed Aug. 31, 2007; Semi-automatic example-based induction of semantic translation rules to support natural language search.

Provisional Application with USPTO, U.S. Appl. No. 60/969,495, filed Aug. 31, 2007; Efficient posting layout for retrieval of terms in dominance hierarchies.

Provisional Application with USPTO, U.S. Appl. No. 60/969,434, filed Aug. 31, 2007; Aboutness identification and indexing.

Provisional Application with USPTO, U.S. Appl. No. 60/969,478, filed Aug. 31, 2007; Semantically-based highlighting of search results.

Provisional Application with USPTO, U.S. Appl. No. 60/969,486, filed Aug. 31, 2007; Fact-based indexing for natural language search.

Provisional Application with USPTO, U.S. Appl. No. 60/969,490, filed Aug. 31, 2007; Indexing and ranking role hierarchies search index.

Provisional Application with USPTO, U.S. Appl. No. 60/971,061, filed Sep. 10, 2007; A system for browsing knowledge on the basis of semantic relations.

Non-Final Office Action mailed Oct. 26, 2011 re U.S. Appl. No. 12/201,721, filed Aug. 29, 2008, 35 pages.

Final Office Action in U.S. Appl. No. 12/201,675 mailed Oct. 3, 2011, 27 pages.

Notice of Allowance and Fees Due in U.S. Appl. No. 12/201,504 mailed Apr. 5, 2012, 25 pages.

Notice of Allowance and Fees Due in U.S. Appl. No. 12/201,721, mailed May 14, 2012, 52 pages.

Agichtein, Eugene and Gravano, Luis, "Snowball Extracting Relations from Large Plain-Text Collections," Columbia University Computer Science Dept. Technical Report CUCS-033-99, Dec. 1999,13 pp.

"A Semantic Search Engine for Learning Resources, http://www.formatex.org/micte2005/349.pdf", 5 pgs.

Dong-IL Han_et_al, "A Study on the Conceptual Modeling and Implementation of a Semantic Search System", Korea Intelligent Information Systems Society, Mar. 2008, vol. 14, No. 1, pp. 67-84.

Rohini Srihari and Wei Li, Cymphony, Inc., Oct. 15, 1999, Information Extraction Supported Question Answering, 12 pgs.

International Search Report and Written Opinion of the ISA mailed Mar. 31, 2009 re International Appl. No. PCT/US2008/074938, Intl. Filing Date Aug. 29, 2008, 12 pgs.

International Search Report and Written Opinion of the ISA mailed Jan. 23, 2009 re International. Application No. PCT/US2008/074978, Intl. Filing Date Sep. 2, 2008, 12 pgs.

(56) References Cited

OTHER PUBLICATIONS

International Search Report and Written Opinion of the ISA mailed Mar. 31, 2009 re International Appl. No. PCT/US2008/074984, Intl. Filing Date Sep. 2, 2008, 12 pgs.

International Search Report and Written Opinion of the ISA mailed Mar. 31, 2009 re International Appl. No. PCT/US2008/074987, Intl. Filing Date Sep. 2, 2008, 12 pgs.

International Search Report and Written Opinion of the ISA mailed Apr. 29, 2009 re International Appl. No. PCT/US2008/074981, Intl. Filing Date Sep. 2, 2008, 11 pgs.

Kapoor_et_al, 'STAR: A System for Tuple and Attribute Ranking of Query Answer' In: International Conference on Data Engineering 2007, Apr. 15, 2007, see whole reference, 2 pgs.

Lo, Ka Kan and Lam, Wai, "Using Semantic Relations with World Knowledge for Question Answering," Dept. of Systems Engineering and Engineering Management, The Chinese University of Hong Kong, Hong Kong, 2008, 6 pp.

Manegold_et_al, A multi-query optimizer for Monet In: Centrum voor Wiskunde en Informatica, Jan. 31, 2000, see abstract, Section 2-3, and Figs. 1-3, 18 pgs.

Non-Final Office Action mailed Mar. 15, 2011 re U.S. Appl. No. 12/201,721, filed Aug. 29, 2008 (12 pgs).

Non-Final Office Action mailed Dec. 23, 2010 re U.S. Appl. No. 12/201,978, filed Aug. 29, 2008 (12 pgs).

Non-Final Office Action mailed Jan. 25, 2011 re U.S. Appl. No. 12/201,675, filed Aug. 29, 2008 (5 pgs).

Gholamreza Fadaie Araghi (2005) Cataloging & Classification Quarterly, 40(2), 5-17: On the Problem of 'Aboutness' in Document Analysis, 1977, 16 pgs.

Ali Hussam, Brian Ford, Gaili Ludwig, Mike Prewitt, Terry Anderson: Semantic Highlighting on the WWW: Educational Implications, Published Nov. 1998, 6 pgs.

Smeaton, A.F and Quigley, I., "Experiments on Using Semantic Distances between Words in Images Caption Retrieval," School of Computer Applications, Working Paper: CA-0196, Dublin City University, Dublin, Ireland, 2008, 8 pp.

T.W.C. Huibers, Dept. of Comp. Science, Utrecht University: Towards an Axiomatic Aboutness Theory for Information Retrieval, 7 pgs.

Vintar, Spela, Buitelaar, Paul and Volk, Martin "Semantic Relations in Concept-Based Cross-Language Medical Information Retrieval," University of Sheffield, Dept. of Computer Science, United Kingdom, 2008, 9 pp.

Non-Final Office Action, mailed Apr. 14, 2011, in U.S. Appl. No. 12/201,675, 21 pp.

Office Action, mailed Mar. 17, 2011 in U.S. Appl. No. 12/201,504, 18 pages.

European Search Report dated Sep. 23, 2011 in Application No. 08799054.5-2201/2185999, 7 pages.

Final Office Action in U.S. Appl. No. 12/201,504 mailed Oct. 12, 2011, 21 pages.

Final Office Action, mailed Jun. 7, 2011 in U.S. Appl. No. 12/201,978, 23 pages.

Final Office Action in U.S. Appl. No. 12/201,978 mailed Aug. 8, 2012, 31 pages.

Non Final Office Action in U.S. Appl. No. 12/201,978 mailed Jan. 4, 2012, 21 pages.

* cited by examiner

FACT-BASED INDEXING FOR NATURAL LANGUAGE SEARCH

This application claims the benefit of priority of U.S. Provisional Patent Application 60/969,486, filed Aug. 31, 2007, and U.S. Provisional Patent Application 60/969,478, filed Aug. 31, 2007, which are incorporated by reference in their entirety herein.

CROSS-REFERENCE TO RELATED APPLICATIONS

Not applicable.

BACKGROUND

Online search engines have become an increasingly important tool for conducting research or navigating documents accessible via the Internet. Often, the online search engines perform a matching process for detecting possible documents, or text within those documents, that utilizes a query submitted by a user. Initially, the matching process, offered by conventional online search engines such as those maintained by Google or Yahoo, allow the user to specify one or more words in the query to describe information that s/he is looking for. Next, the conventional online search engine proceeds to find all documents that contain exact matches of the words and typically presents the result for each document as a block of text that includes one or more of the words provided by the user therein.

Suppose, for example, that the user desired to discover which entity purchased the company PeopleSoft. Entering a query with the words "who bought PeopleSoft" to the conventional online engine produces the following as one of its results: "J. Williams was an officer, who founded Vantive in the late 1990s, which was bought by PeopleSoft in 1999, which in turn was purchased by Oracle in 2005." In this result, the words from the retrieved text that exactly matches the words "who," "bought," and "PeopleSoft," from the query, are bold-faced to give some justification to the user as to why this result is returned. While this result does contain the answer to the user's query, Oracle, there are no indications in the display to draw attention to that particular word as opposed to the other company, Vantive, that was also the target of an acquisition. Moreover, the bold-faced words draw a user's attention towards the word "who," which refers to J. Williams, thereby misdirecting the user to a person who did not buy PeopleSoft and who does not accurately satisfy the query. Accordingly, providing a matching process that promotes exact word matching is not efficient and often more misleading than useful.

Present conventional online search engines are limited in that they do not recognize words in the searched documents corresponding to keywords in the query beyond the exact matches produced by the matching process (e.g., failing to distinguish whether PeopleSoft is the agent of the Vantive acquisition or the target of the Oracle acquisition). Also, convention online search engines are limited because a user is restricted to keywords in a query that are to be matched, and thus, do not allow the user to express precisely the information desired if unknown. Accordingly, implementing a natural language search engine to recognize semantic relations between words of a query and words in searched documents, as well as techniques for highlighting these recognized words when being presented to a user as search results, would uniquely increase the accuracy of the search results and would advantageously direct the user's attention to text in the searched documents that are most responsive to the query.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to computer-readable media and a computer system for implementing a natural language search using fact-based structures. More specifically, this invention relates to generating fact-based structures. Such a fact-based structure is generated using a semantic structure, which represents information, such as the meaning of a piece of text, from a document, such as a web page. Typically, a natural language parser is used to create a syntactic structure of the information, and the parser identifies terms, as well as the relationship between the terms. For example, given the sentence "Mary washes the cat", the syntactic structure associated with this sentence would include the information that "Mary" is the subject of the verb "wash" and "the cat" is the object of that verb. The syntactic representation is then further semantically analyzed to create a semantic representation of the information associating with this sentence the semantic relationship between "Mary", the agent of the action, "the cat", the patient of the action, and "wash" the action, or relation, itself. It should be pointed out the terms agent and patient are chosen here only as an example, and other choices for semantic relations are explicitly meant to be included in this invention. A fact-based structure of a semantic structure allows for a linear structure of these terms and their relationships to be created, while also maintaining identifiers of the terms to convey the dependency of one fact-based structure on another fact-based structure.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention is generally related to computer-readable media and a computer system for implementing a natural language search using fact-based structures. More specifically, this invention relates to generating fact-based structures. Such a fact-based structure is generated using a semantic structure, which represents information, such as the meaning of a piece of text, from a document, such as a web page. Typically, a natural language parser is used to create a syntactic representation of the information, and the parser identifies terms, as well as the relationship between the terms. For example, given the sentence "Mary washes the cat", the syntactic representation associated with this sentence would include the syntactic relationship between the object, subject, and verb in the sentence. The syntactic representation is then further semantically analyzed to create a semantic representation of the information associating with this sentence the semantic relationship between "Mary", the agent of the action, "the cat", the patient of the action, and "wash" the action, or relation, itself. A fact-based structure of a semantic structure allows for a linear structure of these terms and their relationships to be created, while also maintaining identifiers of the terms to convey the dependency of one fact-based structure on another fact-based structure.

In one embodiment, one or more computer-readable media having computer-executable instructions embodied thereon that, when executed, perform a method for generating a fact-based index system for a natural language search is provided. The method includes first generating one or more semantic structures using information from documents, including information about the documents' textual content and possibly information about the document itself, and then, determining the facts within the semantic structures (because facts are the derived core relations between the entities mentioned in a sentence or a text, each semantic structure will contain at least one). And finally, the method includes generating a fact-based structure from each fact found within the semantic structure.

In another embodiment in accordance with the present invention, one or more computer-readable media having computer-executable instructions embodied thereon that, when executed, perform a method for implementing a natural language search using a fact-based index system is provided. The method comprises, in part, generating one or more semantic structures and assigning exactly one identifier for each term in the semantic representation to mark terms that are shared between facts. For example, the sentence "Mary washes the red cat." corresponds to two facts: one expressing that Mary washes the cat, and one expressing that the cat is red. In this case, the term the cat will be assigned exactly one identifier in the semantic representation. As a result, in the two resulting fact-structures, the cat will have the same identifier.

In yet another embodiment, a computer system embodied on one or more computer storage-media having computer-executable instructions provided thereon for performing a method for generating a fact-based structure. The system comprises, in part, a server that invokes a semantic index procedure configured for generating a fact-based structure, wherein the procedure is implemented on, at least, the following components: a fact-based structure generating component for generating a fact-based structure using a functional structure associated with information from documents, the documents containing terms, wherein the functional structure contains one or more facts; and an identifying component for identifying and assigning an unique identifier to each node within the fact-based structure.

Having briefly described an overview of embodiments of the present invention and some of the features therein, an exemplary operating environment suitable for implementing the present invention is described below.

Figure 1:
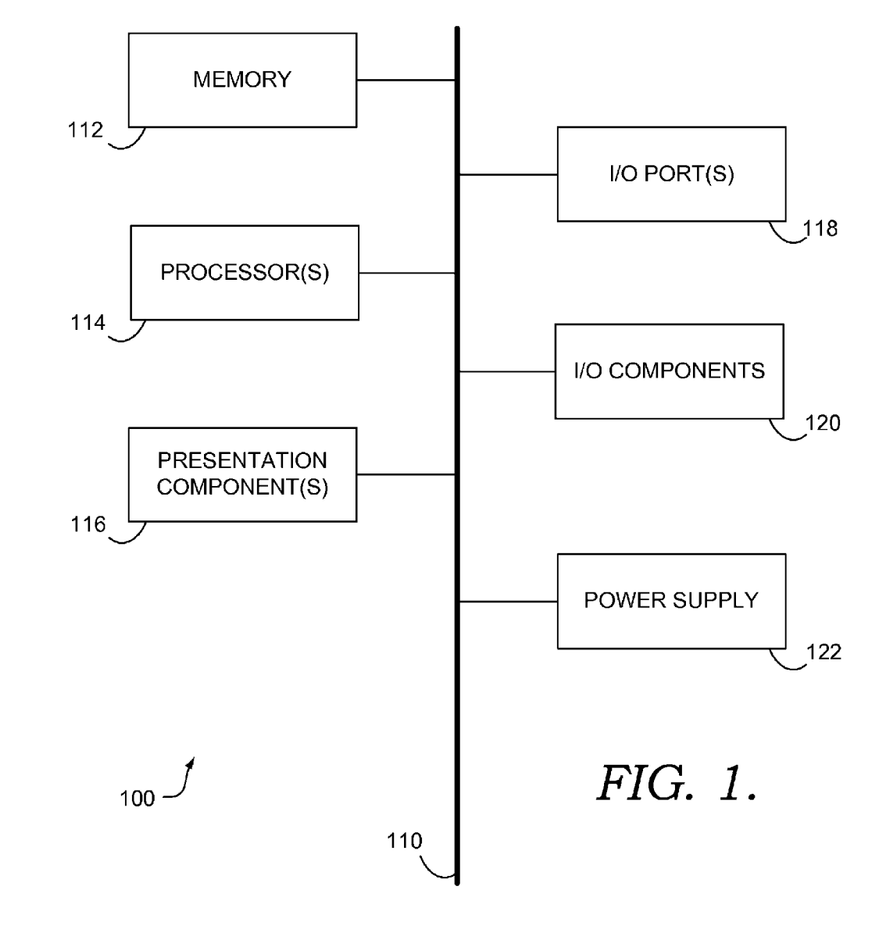
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated to be within the scope of FIG. 1 in reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
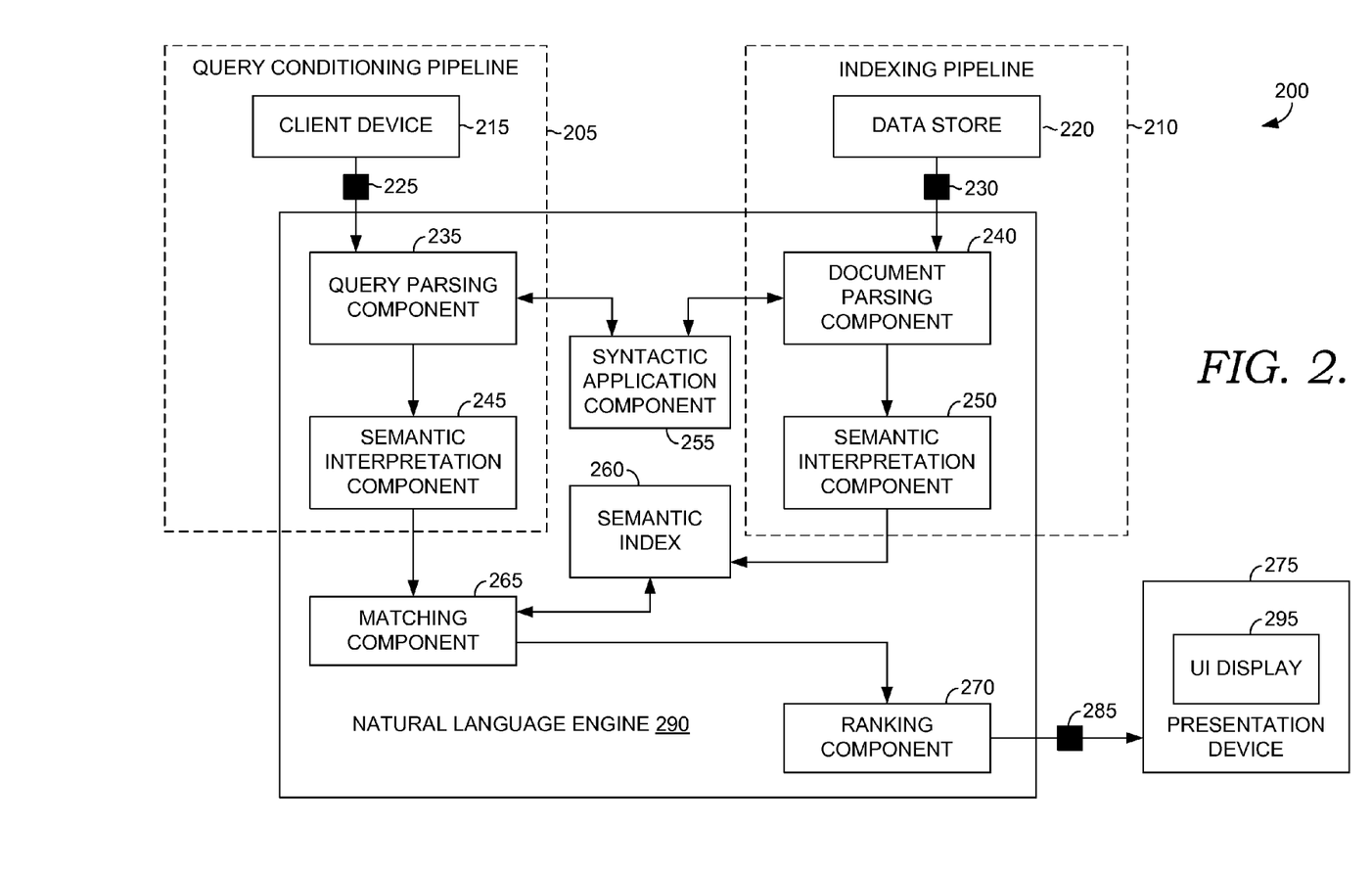
FIG. 2 is a schematic diagram of an exemplary system architecture suitable for use in implementing embodiments of the present invention.

Turning now to FIG. 2, a schematic diagram of an exemplary system architecture 200 suitable for use in implementing embodiments of the present invention is shown, in accordance with an embodiment of the present invention. It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

As illustrated, the system architecture 200 may include a distributed computing environment, where a client device 215 is operably coupled to a natural language engine 290, which, in turn, is operably coupled to a data store 220. In embodiments of the present invention that are practiced in the distributed computing environments, the operable coupling refers to linking the client device 215 and the data store 220 to the natural language engine 290, and other online components through appropriate connections. These connections may be wired or wireless. Examples of particular wired embodiments, within the scope of the present invention, include USB connections and cable connections over a network (not shown). Examples of particular wireless embodiments, within the scope of the present invention, include a near-range wireless network and radio-frequency technology.

It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.). Therefore it is emphasized that embodiments of the connections between the client device 215, the data store 220 and the natural language engine 290, for instance, are not limited by the examples described, but embrace a wide variety of methods of communications. In another embodiment, the computing device may internally accommodate the functionality of the server 250, thereby alleviating dependence on wireless or wired connections.

Exemplary system architecture 200 includes the client device 215 for, in part, supporting operation of the presentation device 275. In an exemplary embodiment, where the client device 215 is a mobile device for instance, the presentation device (e.g., a touchscreen display) may be disposed on the client device 215. In addition, the client device 215 may take the form of various types of computing devices. By way of example only, the client device 215 may be a personal computing device (e.g., computing device 100 of FIG. 1), handheld device (e.g., personal digital assistant), a mobile device (e.g., laptop computer, cell phone, media player), consumer electronic device, various servers, and the like. Additionally, the computing device may comprise two or more electronic devices configured to share information therebetween.

In embodiments, as discussed above, the client device 215 includes, or is operably coupled to the presentation device 275, which is configured to present a UI display 295 on the presentation device 275. The presentation device 275 may be configured as any display device that is capable of presenting information to a user, such as a monitor, electronic display panel, touch-screen, liquid crystal display (LCD), plasma screen, one or more light-emitting diodes (LED), incandescent bulbs, a laser, an electroluminescent light source, a chemical light, a flexible light wire, and/or fluorescent light, or any other display type, or may comprise a reflective surface upon which the visual information is projected. Although several differing configurations of the presentation device 275 have been described above, it should be understood and appreciated by those of ordinary skill in the art that various types of presentation devices that present information may be employed as the presentation device 275, and that embodiments of the present invention are not limited to those presentation devices 275 that are shown and described.

In one exemplary embodiment, the UI display 295 rendered by the presentation device 275 is configured to surface a web page (not shown) that is associated with natural language engine 290 and/or a content publisher. In embodiments, the web page may reveal a search-entry area that receives a query and search results that are discovered by searching the Internet with the query. The query may be manually provided by a user at the search-entry area, or may be automatically generated by software. In addition, as more fully discussed below, the query may include one or more words that, when submitted, invokes the natural language engine 290 to identify appropriate search results that are most responsive to the words in a query.

The natural language engine 290, shown in FIG. 2, may take the form of various types of computing devices, such as, for example, the computing device 100 described above with reference to FIG. 1. By way of example only and not limitation, the natural language engine 290 may be a personal computer, desktop computer, laptop computer, consumer electronic device, handheld device (e.g., personal digital assistant), various remote servers (e.g., online server cloud), processing equipment, and the like. It should be noted, however, that the invention is not limited to implementation on such computing devices but may be implemented on any of a variety of different types of computing devices within the scope of embodiments of the present invention.

Further, in one instance, the natural language engine 290 is configured as a search engine designed for searching for information on the Internet and/or the data store 220, and for gathering search results from the information, within the scope of the search, in response to submission of the query via the client device 215. In one embodiment, the search engine includes one or more web crawlers that mine available data (e.g., newsgroups, databases, open directories, the data store 220, and the like) accessible via the Internet and build a semantic index 260 containing web addresses along with the subject matter of web pages or other documents stored in a meaningful format. In another embodiment, the search engine is operable to facilitate identifying and retrieving the search results (e.g., listing, table, ranked order of web addresses, and the like) from the semantic index that are relevant to search terms within the submitted query. The search engine may be accessed by Internet users through a web-browser application disposed on the client device 215. Accordingly, the users may conduct an Internet search by submitting search terms at the search-entry area (e.g., surfaced on the UI display 295 generated by the web-browser application associated with the search engine).

The data store 220 is generally configured to store information associated with online items and/or materials that have searchable content associated therewith (e.g., documents that comprise the Wikipedia website). In various embodiments, such information may include, without limitation, documents, content of a web page/site, electronic materials accessible via the Internet or a local intranet, and other typical resources available to a search engine. In addition, the data store 220 may be configured to be searchable for suitable access of the stored information. For instance, the data store 220 may be searchable for one or more documents selected for processing by the natural language engine 290. In embodiments, the natural language engine 290 is allowed to freely inspect the data store for documents that have been recently added or amended in order to update the semantic index. The process of inspection may be carried out continuously, in predefined intervals, or upon an indication that a change has occurred to one or more documents aggregated at the data store 220. It will be understood and appreciated by those of ordinary skill in the art that the information stored in the data store 220 may be configurable and may include any information within a scope of an online search. The content and volume of such information are not intended to limit the scope of embodiments of the present invention in any way. Further, though illustrated as a single, independent component, the data store 220 may, in fact, be a plurality of databases, for instance, a database cluster, portions of which may reside on the client device 215, the natural language engine 290, another external computing device (not shown), and/or any combination thereof.

Generally, the natural language engine 290 provides a tool to assist users aspiring to explore and find information online. In embodiments, this tool operates by applying natural language processing technology to compute the meanings of passages in sets of documents, such as documents drawn from the data store 220. These meanings are stored in the semantic index 260 that is referenced upon executing a search. Initially, when a user enters a query into the search-entry area, a query search pipeline 205 analyzes the user's query (e.g., a character string, complete words, phrases, alphanumeric compositions, symbols, or questions) and translates the query into a structural representation utilizing semantic relationships. This representation, referred to hereinafter as a "proposition," may be utilized to interrogate information stored in the semantic index 260 to arrive upon relevant search results. In one instance, the information stored in the semantic index 260 includes representations extracted from the documents maintained at the data store 220, or any other materials encompassed within the scope of an online search. This representation, referred to hereinafter as a "semantic structure," relates to the intuitive meaning of content distilled from common text and may be stored in the semantic index 260. The architecture of the semantic index 260 allows for rapid comparison of the stored semantic structures against the derived propositions in order to find semantic structures that match the propositions and to retrieve documents mapped to the semantic structures that are relevant to the submitted query. Accordingly, the natural language engine 290 can determine the meaning of a user's query requirements from the words submitted into a search interface (e.g., the search-entry area surfaced on the UI display 295), and then to sift through a large amount of information to find corresponding search results that satisfy those needs.

In embodiments, the process above may be implemented by various functional elements that carry out one or more steps for discovering relevant search results. These functional elements include a query parsing component 235, a document parsing component 240, a semantic interpretation component 245, a semantic interpretation component 250, a syntactic application component 255, the semantic index 260, a matching component 265, and a ranking component 270. These functional components 235, 240, 245, 250, 255, 260, 265, and 270 generally refer to individual modular software routines, and their associated hardware that are dynamically linked and ready to use with other components or devices. For example, the syntactic application component 255 can apply specific grammar rules for English. In the case of the Xerox Linguistic Environment (XLE), the grammar is a lexical functional grammar (LFG). However, it should be clear that for the purposes of this invention, any other suitable parser can be used, including those based on Head-Driven Phrase Structure Grammar (HPSG), Combinatory Categorical Grammar (CCG), Probabilistic Context-free Grammar (PCFG), or any other grammar formalism. Grammar may be provided for various languages. For example, LFG grammars have been created for English, French, German, Chinese, and Japanese. Other grammars may be provided as well. Parsing may be ambiguous and result in more than one possible output structure. In that case, the semantic interpretation component 250 will produce more than one possible semantic structure. The semantic component may also produce more than one possible semantic representation for one particular syntactic representation.

Initially, the data store 220, the document parsing component 240, and the semantic interpretation component 250 comprise an indexing pipeline 210. In operation, the indexing pipeline 210 serves to distill the semantic structure from content within documents 230 accessed at the data store 220, and to construct the semantic index 260 upon gathering the semantic structures. As discussed above, when aggregated to form the semantic index 260, the semantic structures may retain a mapping to the documents 230, and/or location of content within the documents 230, from which they were derived.

Generally, the document parsing component 240 is configured to gather data that is available to the natural language engine 290. In one instance, gathering data includes inspecting the data store 220 to scan content of documents 230, or other information, stored therein. Because, the information within the data store 220 may be constantly updated, the process of gathering data may be executed at a regular interval, continuously, or upon notification that an update is made to one or more of the documents 230.

Upon gathering the content from the documents 230 and other available sources, the document parsing component 240 performs various procedures to prepare the content for semantic analysis. These procedures may include text extraction, entity recognition, and syntactic parsing. The text extraction procedure substantially involves extracting tables, images, templates, and textual sections of data from the content of the documents 230 and to converting them from a raw online format to a format usable for the syntactic application component 255 (e.g., HyperText Markup Language (HTML), plain text, eXtensible Markup Language (XML), etc.), while saving links to documents 230 from which they are extracted in order to facilitate mapping. The usable format of the content may then be split up into sentences. In one instance, breaking content into sentences involves assembling a string of characters as an input, applying a set of rules to test the character string for specific properties, and, based on the specific properties, dividing the content into sentences. By way of example only, the specific properties of the content being tested may include punctuation and capitalization in order to determine the beginning and end of a sentence. Once a series of sentences is ascertained, each individual sentence is examined to detect words therein and to potentially recognize each word as an entity (e.g., "The Hindenburg"), an event (e.g., "World War II"), a time (e.g., "September"), or any other category of word that may be utilized for promoting distinctions between words or for understanding the meaning of the subject sentence.

The entity recognition procedure assists in recognizing which words are names, as they provide specific answers to question-related words of a query (e.g., who, where, when). In embodiments, recognizing words includes identifying words as names and annotating the word with a tag to facilitate retrieval when interrogating the semantic index 260. In one instance, identifying words as names includes looking up the words in predefined lists of names to determine if there is a match. If no match exists, statistical or structural information may be used to guess whether the word is a name. For example, statistical information may assist in recognizing a variation of a complex name, such as "USS Enterprise," which may have several common variations in spelling. Structural information may be used to recognize "John R. Walters" as a name, based on the knowledge that "John" is a first name, "Walters" a possible last name, and "R." a possible initial, combined with knowledge about how names combine.

The parsing procedure, when implemented, provides insights into the structure of the sentences identified above. In one instance, these insights are provided by applying rules maintained in a framework of the syntactic application component 255. When applied, these rules, or grammars, expedite analyzing the sentences to distill representations of the relationships among the words in the sentences. As discussed above, these representations are referred to as syntactic structures, and allow the semantic interpretation component 250 to capture critical information about the structure of the sentence (e.g., verb, subject, object, and the like). In cases where more than one possible set of relationships between the words is possible, the output will be ambiguous. If the parser is capable of managing ambiguity directly, as is the case of the XLE, the result will be one ambiguous syntactic structure. If the parser does not handle ambiguity directly, the resulting output may be a set of syntactic structures.

The semantic interpretation component 250 is generally configured to diagnose the role of each word in the syntactic structure by recognizing a semantic relationship between the words. Initially, diagnosing may include analyzing the grammatical organization of the syntactic structure and separating the syntactic structure into logical assertions that each express a discrete idea and particular facts. These logical assertions may be further analyzed to determine a function of each of a sequence of words that comprises the assertion. If appropriate, based on the function or role of each word, one or more of the sequence of words may be expanded to include synonyms (i.e., linking to other words that correspond to the expanded word's specific meaning) or hypernyms (i.e., linking to other words that generally relate to the expanded word's general meaning). This expansion of the words, the function each word serves in an expression (discussed above), a grammatical relationship of each of the sequence of words, and any other information about the semantic structure, recognized by the semantic interpretation component 250, may be stored at the semantic index 260. In the case of ambiguous input of syntactic structures, this may involve either preserving the ambiguity, resulting in an ambiguous semantic structure, or in the case of a set of input syntactic structures, there may be a set of resulting semantic structures. Additionally, one syntactic structure may give rise to a semantic ambiguity, resulting in an ambiguous semantic structure in the case of an ambiguity enabled system like the XLE, or more than one semantic structure in non-ambiguity enabled systems.

The semantic index 260 serves to store the information about the semantic structure derived by the indexing pipeline 210 and may be configured in any manner known in the relevant field. By way of example, the semantic index may be configured as an inverted index that is structurally similar to conventional search engine indexes. In this exemplary embodiment, the inverted index is a rapidly searchable database whose entries are words with pointers to the documents 230, and locations therein, on which those words occur. Accordingly, when writing the information about the semantic structures to the semantic index 260, each word and associated function is indexed along with the pointers to the sentences in documents in which the semantic word appeared. Additionally, in the case of ambiguity, all possible semantic structures are stored in the semantic index. This framework of the semantic index 260 allows the matching component 265 to efficiently access, navigate, and match stored information to recover meaningful search results that correspond with the submitted query.

The client device 215, the query parsing component 235, and the semantic interpretation component 245 comprise a query conditioning pipeline 205. Similar to the indexing pipeline 210, the query conditioning pipeline 205 distills meaningful information from a sequence of words. However, in contrast to processing passages within documents 230, the query conditioning pipeline 205 processes words submitted within a query 225. For instance, the query parsing component 235 receives the query 225 and performs various procedures to prepare the words for semantic analysis. These procedures may be similar to the procedures employed by the document parsing component 240 such as text extraction, entity recognition, and parsing. In addition, the structure of the query 225 may be identified by applying rules maintained in a framework of the LFG application component 255, thus, deriving a meaningful representation, or proposition, of the query 215.

In embodiments, the semantic interpretation component 245 may process the proposition in a substantially comparable manner as the semantic interpretation component 250 interprets the function structure derived from a passage of text in a document 230. In other embodiments, the semantic interpretation component 245 may identify a grammatical relationship of the words within the string of words that comprise the query 225. By way of example, identifying the grammatical relationship includes identifying whether a word functions as the subject (agent of an action), object, predicate, indirect object, or temporal location of the proposition of the query 225. In another instance, the proposition is evaluated to identify a logical language structure associated with each of the words. By way of example, evaluation may include one or more of the following steps: determining a function of at least one of the words; based on the function, replacing the words with a logical variable that encompasses a plurality of meanings; and writing those meanings to the proposition of the query. This proposition of the query 225, the words, and the information distilled from the proposition and/or words are then sent to the matching component 265 for comparison against the structural functions extracted from the documents 230 and stored at the semantic index 260.

In an exemplary embodiment, the matching component 265 compares the propositions of the queries 225 against the structural functions at the semantic index 260 to ascertain matching structural functions. These matching structural functions may be mapped back to the documents 230 from which they were extracted utilizing the tags appended to the structural functions. These documents 230, targeted by the tags, are collected and sorted by the ranking component 270. Sorting may be performed in any known method within the relevant field, and may include without limitation, ranking according to closeness of match, listing based on popularity of the returned documents 230, or sorting based on attributes of the user submitting the query 225. These ranked documents 230 comprise the search result 285 and are conveyed to the presentation device 275 for surfacing in an appropriate format on the UI display 295.

With continued reference to FIG. 2, this exemplary system architecture 200 is but one example of a suitable environment that may be implemented to carry out aspects of the present invention and is not intended to suggest any limitation as to the scope of use or functionality of the invention. Neither should the illustrated exemplary system architecture 200, or the natural language engine 290, be interpreted as having any dependency or requirement relating to any one or combination of the components 235, 240, 245, 250, 255, 260, 265, and 270 as illustrated. In some embodiments, one or more of the components 235, 240, 245, 250, 255, 260, 265, and 270 may be implemented as stand-alone devices. In other embodiments, one or more of the components 235, 240, 245, 250, 255, 260, 265, and 270 may be integrated directly into the client device 215. It will be understood by those of ordinary skill in the art that the components 235, 240, 245, 250, 255, 260, 265, and 270 illustrated in FIG. 2 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting (e.g., although only one presentation device 275 is shown, many more may be communicatively coupled to the client device 215).

Figure 3:
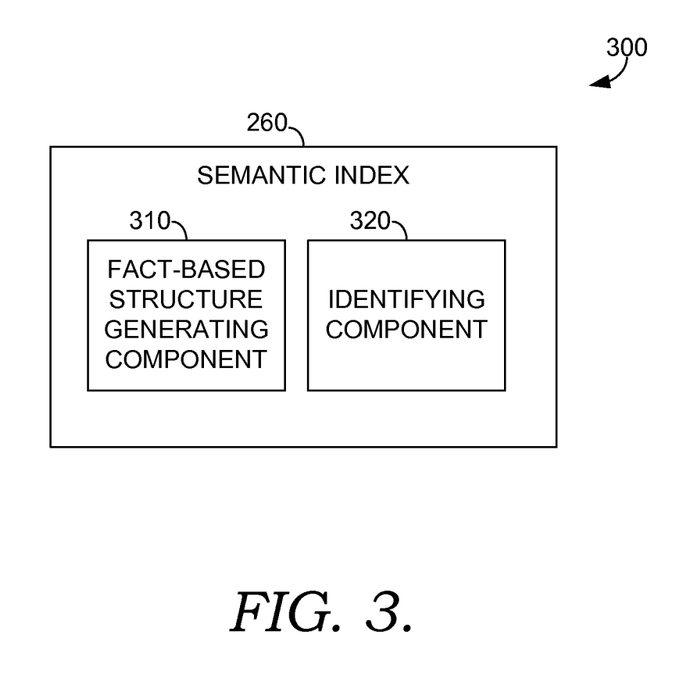
FIG. 3 is a schematic diagram of a subsystem within the exemplary system architecture, in accordance with an embodiment of the present invention.

Turning now to FIG. 3, a diagram 300 representing a semantic index (e.g., the semantic index 260 from FIG. 2) is provided. Within the semantic index 260, various components may be used therein to generate a fact-based index, thereby providing a method of storing the indexed information. Storing the information in such a fact-based index allows for more efficient retrieval of the information, for example, by the matching component 265 of FIG. 2.

Exemplary components within the semantic index 260 include a fact-based structure generating component 310 and an identifying component 320. One skilled in the art will appreciate that other components may be used in conjunction with or in place of these illustrated components. The fact-based structure generating component 310 is configured to generate a fact-based structure using, for example, information provided from the indexing pipeline 210 from FIG. 2. Such information has been parsed and the semantic relationship between the terms has been determined before being received at the semantic index 260. In embodiments of the present invention, as discussed above, this information is in the form of a semantic structure. The identifying component 320 is configured to provide an identifier to each node, and will be discussed further below with respect to FIGS. 5 and 6.

Figure 4:
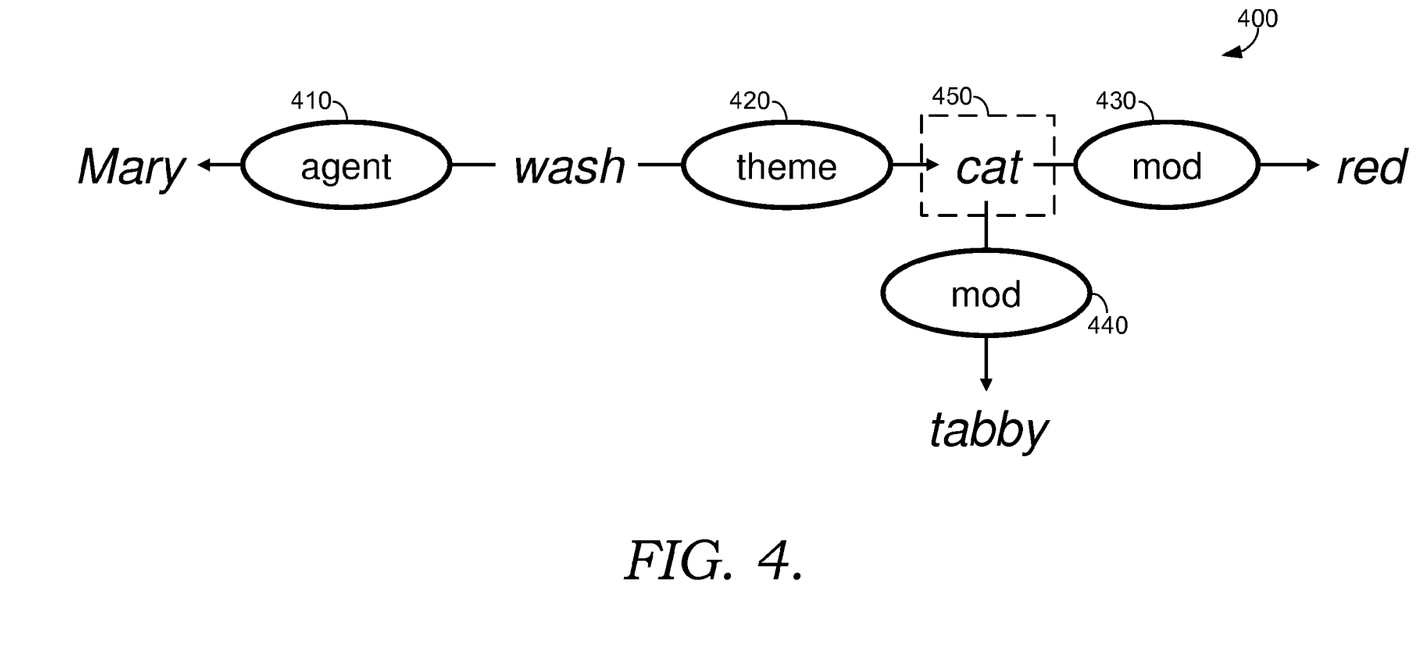
FIG. 4 is illustrative of a semantic structure, in accordance with an embodiment of the present invention.
Figure 5:
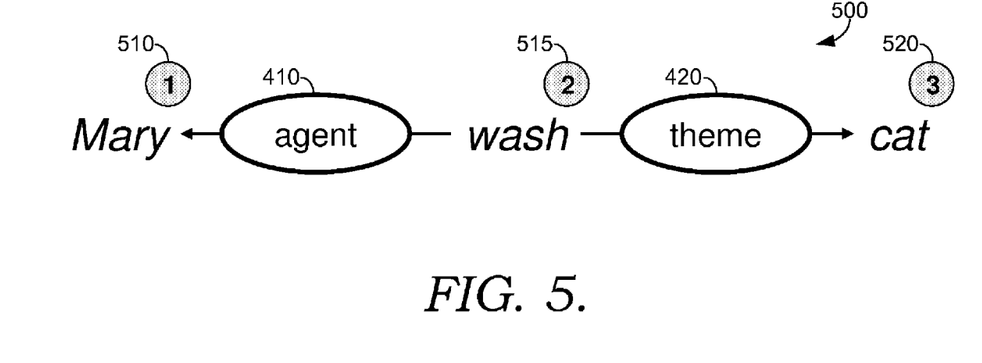
FIGS. 5-6 are illustrative of fact-based structures, in accordance with an embodiment of the present invention.
Figure 6:
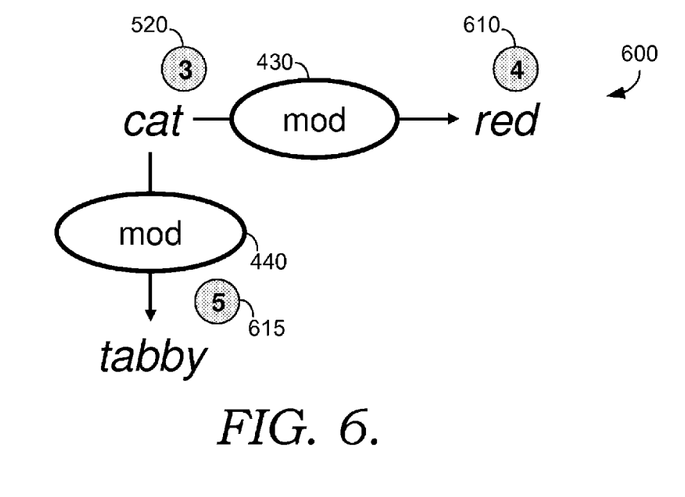

The fact-based structure generating component 310 uses the semantic structure to generate fact-based structures. A fact-based structure, as used herein, refers to a structure associated with each core element, or fact, of the semantic structure. As illustrated in FIGS. 4-6, a fact-based structure contains various elements, including nodes and edges. One skilled in the art, however, will appreciate that a fact-based structure is not limited to this specific structure. Each node in a fact-based structure, as used herein, represents the elements of the semantic structure, where the edges of the structure connect the nodes and represent the relationships between those elements. In embodiments, the edges may be directed and labeled, with these labels representing the roles of each node.

FIG. 4 illustrates a structure 400 in accordance with an embodiment of the present invention. This illustrated structure is not yet a fact-based structure generated by the fact-based structure generating component 310, but represents an interim structure that the component utilizes to generate such a fact-based structure. Here, the original sentence is "Mary washes a red tabby cat." As discussed above, the indexing pipeline 210 in FIG. 2 has identified the words or terms and the relationship between these words or terms. In one example, these relationships for the sentence may be represented as:

agent (wash, Mary)
theme (wash, cat)
mod (cat, red)
mod (cat, tabby)

In other words, "agent" describes the relationship between Mary and wash. Thus, in FIG. 4, the edge 410 connecting the nodes Mary and wash is labeled as "agent." Further, "theme" describes the relationship between wash and cat, and edge 420 is labeled accordingly. The term "mod" indicates that the terms red and tabby modify cat. These roles are then used to label edges 430 and 440. It will be understood that these labels are merely examples, and are not intended to limit the present invention.

A structure is generated for each node that is the target of one or more edges. The term, cat, illustrated as node 450, is referred to herein as a head node. A head node is a node that is the target of more than one edge. In this example, cat relates to three other nodes (e.g., wash, red, and tabby), and thus, would be a head node. The structure 400 contains two facts, one around the head node wash and one around the head node cat. The semantic structure illustrated by structure 400 allows the dependency between the nodes or words within the sentence to be displayed.

In FIG. 5, the structure 400 of FIG. 4 is divided such that, with cat as a head node, only one fact within the semantic structure is illustrated as structure 500. This fact-based structure illustrates the first fact in the semantic structure, one that revolves around the wash node. FIG. 6 illustrates structure 600, a fact-based structure that revolves around the second fact in the semantic structure, or the cat node.

Additionally, exactly one identifier may be assigned to each node, for example, by utilizing the identifying component 320 in FIG. 3. In embodiments of the invention, this identifier is referred to as a skolem identifier. One identifier is assigned to one term, regardless of whether the term is included on more than one fact-based structure. Here, as shown in FIG. 5, the Mary node is assigned identifier 510, as "1". The wash node is assigned identifier 515, as "2". And, the cat node is assigned identifier 520, as "3". Because the cat node is also included in the fact-based structure 600 in FIG. 6, it is assigned the same identifier 520. Red and tabby are assigned identifiers 610 and 620, respectively.

Not only is each term assigned the same identifier, but each entity is assigned the identifier. An entity, as referred to herein, describes different terms that represent the same thing. For example, if the sentence were "Mary washes her red tabby cat." Her would be illustrated as a node, and although it is a different term than Mary, it still represents the same entity as Mary. Thus, in a fact-based structure of this sentence, the Mary and her node would be assigned the same identifier. By storing the facts corresponding to 500 and 600 separately in the semantic index, and using identifiers to link nodes that are the same, encoding of the graph 400 is achieved that allows for superior retrieval efficiency over earlier methods of storing graphs.

Figure 7:
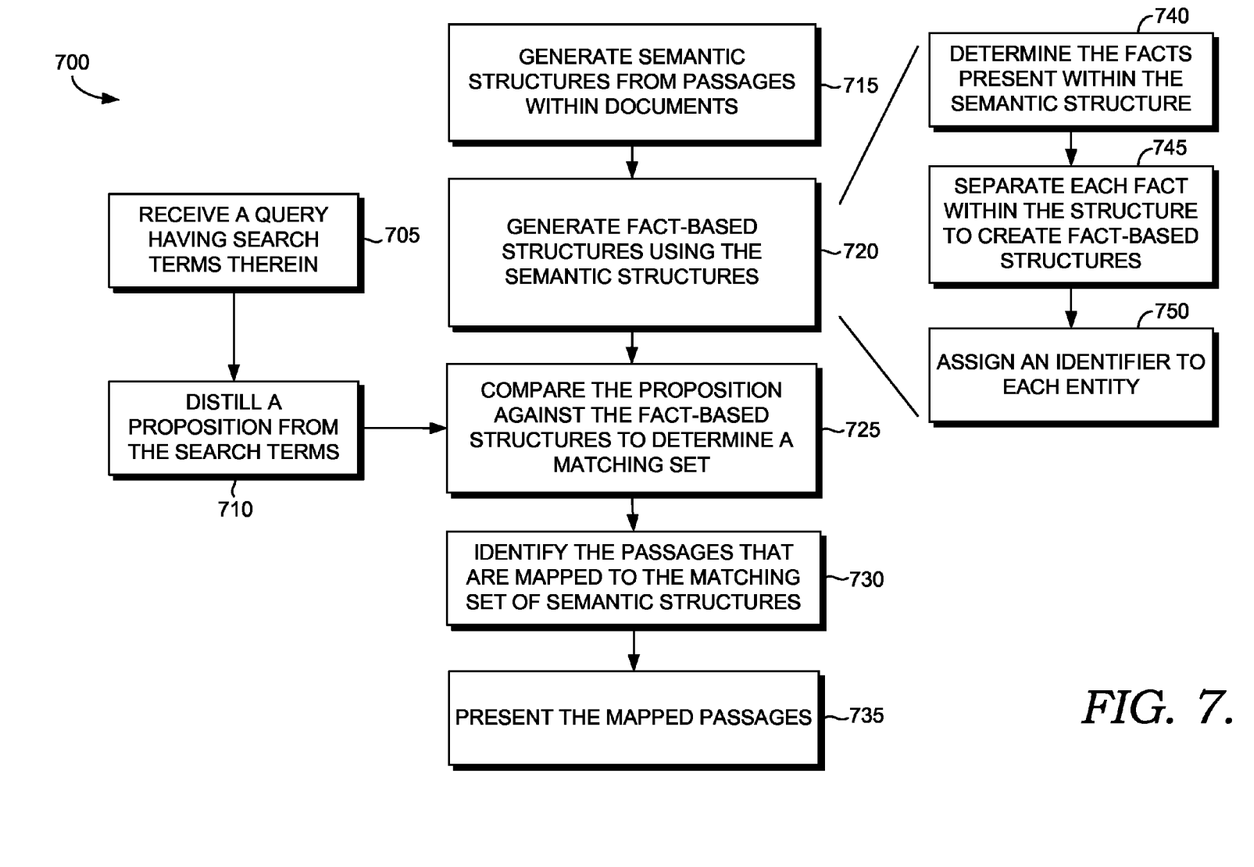
FIG. 7 is a flow diagram illustrating an overall method for implementing a natural language search using fact-based structures, in accordance with an embodiment of the present invention.

Turning now to FIG. 7, a method 700 for implementing a natural language search by generating fact-based structures is provided, in accordance with embodiments of the present invention. First, as indicated by block 705, a query is received having search terms therein. The query may be received from any source, including, for example, an input query for a search engine that is inputted from a client device, such as client device 215 in FIG. 2. At block 710, a proposition is distilled from the search terms received at block 705. An exemplary method of distilling a proposition is performed by the query parsing component 235 in FIG. 2, also utilizing the syntactic application component 255.

Additionally, at block 715, a semantic structure is generated from passages within documents accessible to a search engine. In embodiments, this step is performed by the indexing pipeline 210 in FIG. 2. Next, at block 720, using the semantic structures generated at block 715, a fact-based structure is generated. More than one fact-based structure may be generated from one semantic structure, as each semantic structure may comprise one or more facts.

In performing the method of block 720, additional steps may occur. For example, at block 740, a semantic structure is analyzed to determine each fact within the semantic structure. A fact serves as a fundamental unit for indexing. Further, at block 745, each determined fact is separated to create a fact-based structure for each fact. Subsequently, each term or entity within each fact-based structure is assigned exactly one identifier, as indicated at block 750. As discussed above, it is possible for a term from a semantic structure to be present in more than one fact-based structure. When this is the case, the term will receive the same identifier in both facts, thus linking the fact-based structures by this reference.

At block 725, the proposition distilled at block 710 is compared against the fact-based structures generated at block 720. In doing so, a matching set is determined, for example, utilizing the matching component 265 in FIG. 2. When a match has been determined, passages related to those fact-based structures are identified. Because the semantic structure has been used to construct a fact-based structure, these passages will be identified and retrieved in a more efficient manner. These mapped passages are then presented at block 735, for example, utilizing the presentation device 275 in FIG. 2.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-storage media having computer-executable instructions embodied thereon that, when executed, perform a method for generating a semantic index that employs a fact-based structure for a search, the method comprising:
   generating one or more semantic relationships from textual content within online documents, wherein the process of generating comprises:
   (a) identifying a sentence within from the textual content of the online documents;
   (b) distilling a syntactic structure of the sentence;
   (c) separating the sentence into two or more logical assertions based on, in part, a grammatical organization of the syntactic structure;
   (d) analyzing the two or more logical assertions to determine a linguistic functionality of one or more terms within the two or more logical assertions; and
   (e) deriving the one or more semantic relationships from the linguistic functionality of the one or more terms; and
   representing the one or more semantic relationships as two or more fact-based structures, respectively, via the process comprising:
   (a) representing the one or more terms as nodes;
   (b) representing the linguistic functionality of one or more terms as edges that interconnect the nodes, respectively, wherein each edge involves a direction of dependency that targets a single node;
   (c) identifying from the nodes one or more head nodes, wherein the one or more head nodes are nodes being targeted by two or more of the edges;
   (d) generating the two or more fact-based structures from the one or more head nodes, respectively, wherein a fact-based structure is directed toward one of the one or more head nodes, respectively; and
   (e) storing the two or more fact-based structures in the semantic index.

2. The media of claim 1, wherein the one or more syntactic structures between the one or more terms from the textual content reveals the one or more semantic relationships between the one or more terms.

3. The media of claim 1, wherein the nodes include expansions of the terms represented thereby, wherein the expansions include synonyms of the terms.

4. The media of claim 1, wherein the textual content within the online documents that is associated with the two or more fact-based structures is accessed when a proposition of a search query matches at least one of the two or more fact-based structures.

5. One or more computer-storage media having computer-executable instructions embodied thereon that, when executed, perform a method for implementing an index system that employs a fact-based structure for a search, the method comprising:

generating one or more semantic relationships from textual content within online documents, wherein the process of generating comprises:
(a) identifying a sentence within the textual content of the online documents;
(b) distilling a syntactic structure of the sentence
(c) separating the sentence into two or more logical assertions based on, in part, a grammatical organization of the syntactic structure
(d) analyzing the two or more logical assertions to determine a linguistic functionality of one or more terms within the two or more logical assertions; and
(e) deriving the one or more semantic relationships from the linguistic functionality of the one or more terms; and representing the one or more semantic relationships as two or more fact-based structures, respectively, via the process comprising:
(a) representing the one or more terms as nodes;
(b) representing the linguistic functionality of one or more terms as edges that interconnect the nodes, respectively, wherein each edge targets a single node;
(c) identifying from the nodes one or more head nodes, wherein the one or more head nodes are nodes being targeted by two or more of the edges;
(d) generating the two or more fact-based structures from the one or more head nodes, respectively, wherein a fact-based structure is directed toward one of the one or more head nodes, respectively; and
(e) storing the two or more fact-based structures in the index system.

6. The media of claim 5, wherein, when a first term and a second term of the terms within different fact-based structures are assigned to a same identifier when the first term and the second term relate to a same entity.

7. The media of claim 5, wherein the online documents include web pages.

8. The media of claim 5, wherein the method further comprises identifying matches between a search query and the two or more fact-based structures.

9. The media of claim 8, wherein the method further comprises retrieving the two or more matched fact-based structures.

10. A computer system embodied on one or more computer storage-media having computer-executable instructions provided thereon for performing a method for generating two or more fact-based structures, the system comprising:

a server that invokes a procedure configured for generating one or more fact-based structures, wherein the server comprises a processing unit coupled to the storage media, the storage having stored thereon a plurality of computer software components executable by the processing unit, the computer software components comprising:
(a) a fact-based structure generating component for generating the two or more fact-based structures using a process comprising:
(i) identifying one or more terms from textual content of documents;
(ii) determining a linguistic functionality of one or more terms and deriving one or more semantic relationships from the linguistic functionality of one or more terms;
(iii) representing the one or more terms as nodes;
(iv) representing the linguistic functionality of one or more terms as edges that interconnect the nodes, respectively, wherein each edge involves a direction of dependency that targets a single node;
(v) identifying from the nodes one or more head nodes, wherein the one or more head nodes are nodes being targeted by two or more of the edges; and
(vi) generating the two or more fact-based structures from the one or more head nodes, respectively, wherein a fact-based structure is directed toward one of the one or more head nodes, respectively; and
(b) an identifying component for assigning identifiers to the nodes within the two or more fact-based structures, respectively, wherein common nodes across the two or more fact-based structures are assigned a common identifier, and wherein the assigned identifiers are stored in the semantic index promoting retrieval across the two or more fact-based structures.

11. The computer system of claim 10, wherein the computer software components further comprising a receiving component to receive a search query from a user.

12. The computer system of claim 11, wherein the computer software components further comprising a matching component to match a proposition of the search query to the fact-based structure, wherein the proposition is a structural representation of terms within the search query derived from, in part, semantic relationships between the terms of the search query.

* * * * *